(12) United States Patent
Gerhards et al.

(10) Patent No.: US 11,008,040 B2
(45) Date of Patent: May 18, 2021

(54) VEHICLE CHASSIS FOR AN ELECTRICALLY POWERED VEHICLE

(71) Applicant: Ford Global Technologies, LLC, Dearborn, MI (US)

(72) Inventors: Thomas Gerhards, Niederzier (DE); Ralf Hintzen, Aachen (DE); Daniel Mainz, Herzogenrath (DE); Friedrich Peter Wolf-Monheim, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 175 days.

(21) Appl. No.: 16/244,775

(22) Filed: Jan. 10, 2019

(65) Prior Publication Data

US 2019/0210650 A1 Jul. 11, 2019

(30) Foreign Application Priority Data

Jan. 11, 2018 (DE) .................... DE102018200329.7

(51) Int. Cl.
*B62D 21/03* (2006.01)
*B60K 7/00* (2006.01)
(Continued)

(52) U.S. Cl.
CPC .............. *B62D 21/03* (2013.01); *B60G 3/00* (2013.01); *B60K 1/04* (2013.01); *B60K 7/0007* (2013.01);
(Continued)

(58) Field of Classification Search
CPC ........ B62D 21/03; B62D 21/12; B62D 27/02; B60L 50/64; B60L 50/66; B60K 1/04; B60K 7/0007
See application file for complete search history.

(56) References Cited

U.S. PATENT DOCUMENTS 2,049,904 A * 8/1936 Girling ................. B60G 11/14
267/254
7,913,788 B1 3/2011 Bryer et al.
(Continued)

FOREIGN PATENT DOCUMENTS

CN 101559705 A 10/2009
CN 103465763 A 12/2013
(Continued)

OTHER PUBLICATIONS

G. Mcgroaty, Tesla Adds Titanium Shielding to Protect Batteries-What Does BMW Offer in i Models, Apr. 16, 2014.

*Primary Examiner* — Faye M Fleming
(74) *Attorney, Agent, or Firm* — Raymond L. Coppiellie; Burgess Law Office, PLLC

(57) ABSTRACT

A chassis for an electrically powered vehicle including a front wheel suspension and a rear wheel suspension each having longitudinal control arms arranged on both sides and a torsion spring actively connected to the longitudinal control arms. The chassis includes a battery housing receiving a propulsion battery. A front transverse carrier extends between the respective longitudinal control arms of the front wheel suspension and a rear transverse carrier extends between the respective longitudinal control arms of the rear wheel suspension. The respective transverse carriers are rigidly connected to the battery housing and couple the longitudinal control arms and the torsion spring.

7 Claims, 5 Drawing Sheets

(51) Int. Cl.
  *B60L 50/64*   (2019.01)
  *B60L 50/60*   (2019.01)
  *B60K 1/04*   (2019.01)
  *B62D 21/12*   (2006.01)
  *B62D 27/02*   (2006.01)
  *B60G 3/00*   (2006.01)
  *B62D 21/14*   (2006.01)
  *B62D 29/04*   (2006.01)

(52) U.S. Cl.
  CPC .............. *B60L 50/64* (2019.02); *B60L 50/66* (2019.02); *B62D 21/12* (2013.01); *B62D 27/02* (2013.01); *B60K 2001/0438* (2013.01); *B60K 2007/0038* (2013.01); *B60K 2007/0092* (2013.01); *B62D 21/14* (2013.01); *B62D 29/041* (2013.01)

(56) References Cited

U.S. PATENT DOCUMENTS

| | | | |
|---|---|---|---|
| 8,083,245 B2 | 12/2011 | Hatzikakidis | |
| 9,446,643 B1* | 9/2016 | Vollmer | B60K 1/00 |
| 9,669,873 B2* | 6/2017 | Buschjohann | B60G 7/001 |
| 9,764,629 B2* | 9/2017 | Schmalzrieth | F16F 15/08 |
| 10,780,923 B2* | 9/2020 | Caliskan | B62D 27/02 |
| 2016/0068195 A1* | 3/2016 | Hentrich | B62D 25/2036 |
| | | | 180/68.5 |
| 2020/0369140 A1* | 11/2020 | McCarron | B60K 17/06 |

FOREIGN PATENT DOCUMENTS

| | | | | |
|---|---|---|---|---|
| DE | 102009004465 A1 * | 7/2010 | .............. | B60K 1/00 |
| GB | 1179282 A | 1/1970 | | |

* cited by examiner

VEHICLE CHASSIS FOR AN ELECTRICALLY POWERED VEHICLE

CROSS-REFERENCE TO RELATED APPLICATIONS

Not Applicable.

BACKGROUND OF THE INVENTION

1. Field of the Invention

The present invention relates generally to a vehicle chassis; and more specifically to a chassis for use with an electrically powered vehicle.

2. Description of Related Art

In the field of automotive technology, motor vehicles having a main drive containing an electric motor operated by an electrical current generated by an electrochemical energy accumulator or energy converter are known. The electrochemical energy accumulator or energy converter may be formed by at least one rechargeable accumulator or fuel cell stack.

In motor vehicles with conventional internal combustion engines, the arrangement, or packaging, of the components, for example drive train, chassis, bodywork, of the motor vehicle has been refined over many decades of development. In a motor vehicle with an electrochemical energy accumulator or energy converter, the external dimensions and couplings to other components of the motor vehicle differ greatly from those of a motor vehicle with conventional internal combustion engine. Electrically powered motor vehicles therefore require different solutions for the packaging of components inside the motor vehicle for example the chassis and drive system.

SUMMARY OF THE INVENTION

A chassis for an electrically powered vehicle including a wheel suspension having first and second longitudinal control arms. The chassis has a battery housing and a transverse carrier having a hollow profile defining a cavity. The transverse carrier rigidly connects to the battery housing and rotatably supports the first and second front longitudinal control arms of the wheel suspension. A torsion spring disposed within the cavity connects to at least one of the first and second longitudinal control arms and to said transverse carrier. An electrically controllable actuator disposed within the cavity couples the transverse carrier to the torsion spring.

Further areas of applicability of the present invention will become apparent from the detailed description provided. It should be understood the detailed description and specific examples, while indicating an exemplary or preferred embodiment of the invention, are intended for illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

In the various figures, the same parts always carry the same reference signs, so these are usually only described once.

Figure 1:
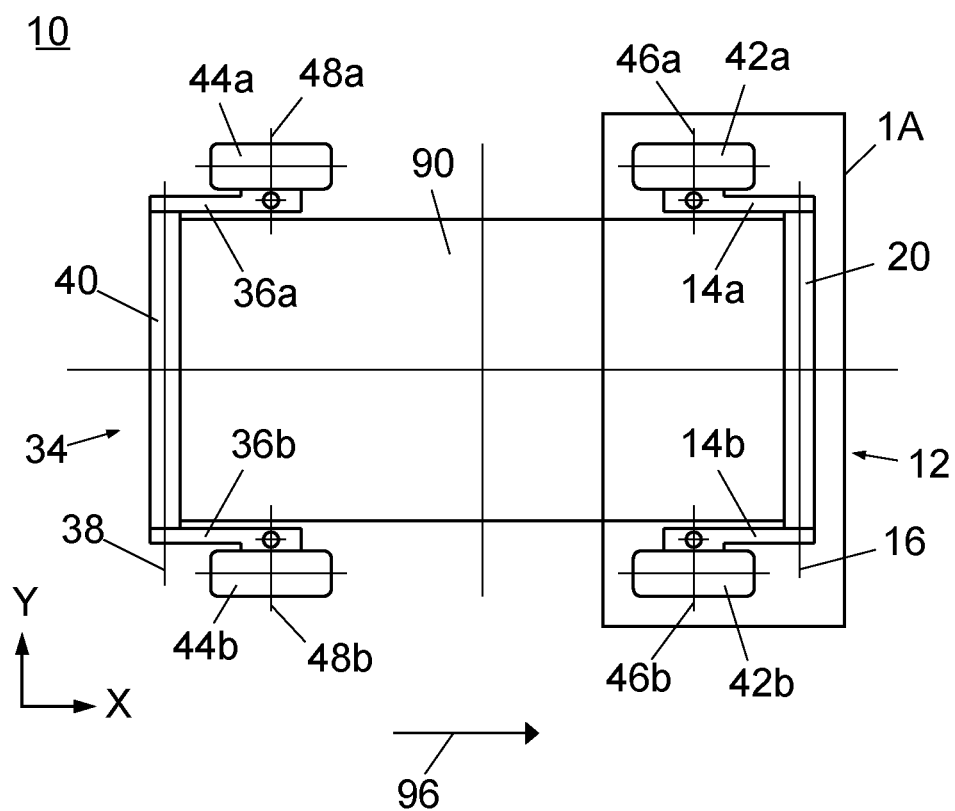
FIG. 1 is a diagrammatic depiction of a top view of a chassis of an electrically powered motor vehicle.

FIG. 1 shows, in a top view, a diagrammatic schematic depiction of an embodiment of a chassis 10 according to the invention of an electrically powered motor vehicle, in the installed state. In FIG. 1, the forward and straight-ahead direction of travel 96, also referred to as the direction of travel 96, of the motor vehicle runs from the left to the right in the drawing plane, i.e. parallel with a selected X direction.

The chassis 10 includes a front wheel suspension 12 and a rear wheel suspension 34. The front wheel suspension 12 has a left front longitudinal control arm 14a, extending parallel to the direction of travel 96, and a right front longitudinal control arm 14b also extending parallel to the direction of travel 96. The rear wheel suspension 34 has a left rear longitudinal control arm 36a, extending parallel to the direction of travel 96, and a right rear longitudinal control arm 36b also extending parallel to the direction of travel 96. The designations left and right refer to respective sides of the vehicle considering the direction of travel 96.

The chassis 10 includes a battery housing 90 equipped with an internal cavity that receives and secures a propulsion battery. The battery housing 90 may, for example, be produced from an extruded profile of aluminum or an aluminum alloy. The battery housing 90 is substantially cuboid, wherein the shortest side faces of the cube are oriented perpendicularly to the direction of travel 96 of the motor vehicle.

The motor vehicle has four wheel-tire combinations 42a, 42b, 44a, 44b. Each of the four longitudinal control arms 14a, 14b, 36a, 36b has an end facing the wheel and an end facing away from the wheel. At a wheel-facing end of each of the four longitudinal control arms 14a, 14b, 36a, 36b, one of the four wheel-tire combinations 42a, 42b, 44a, 44b is rotatably mounted about an axis of rotation 46a, 46b, 48a, 48b oriented substantially parallel to a road surface.

A front transverse carrier unit 20 extends between the left and right longitudinal control arms 14a, 14b of the front wheel suspension device 12, for coupling the two longitudinal control arms 14a, 14b. The front transverse carrier unit 20 is coupled to the ends of the left and right longitudinal control arms 14a, 14b facing away from the respective wheels 42a, 42b. The front transverse carrier unit 20 is formed as a straight, hollow profiled rail and may for example be produced from an aluminum extruded hollow profile. The front transverse carrier unit 20 is oriented so a center line 16 of the front transverse carrier unit 20 is parallel to a front side and rear side of the installed battery housing 90. The front transverse carrier unit 20 is in mutual contact with the front side of the battery housing 90 and is rigidly connected to the battery housing 90. The rigid connection between the front transverse carrier unit 20 and the battery housing 90 may be created for example by welding or brazing along the entire transverse extension of the battery housing 90.

The front transverse carrier unit 20, the left front longitudinal control arm 14a, and right front longitudinal control arm 14b form a U-shaped unit which, in the region of the longitudinal control arms 14a, 14b, is adapted to the battery housing 90 with the necessary spacing to achieve a compact structure of the chassis device 10 wherein the propulsion battery can be received in the battery housing 90 of the chassis device 10 without restrictions in relation to form.

A rear transverse carrier unit 40 mechanically coupling the left and right longitudinal control arms 36a, 36b extends between the left longitudinal control arm 36a and the right longitudinal control arm 36b of the rear wheel suspension device 34. The rear transverse carrier unit 40 is coupled to the ends facing away from the wheel of the left and right rear longitudinal control arms 36a, 36b. The rear transverse carrier unit 40 is formed as a straight, hollow profiled rail and may for example be produced from an aluminum extruded hollow profile. The rear transverse carrier unit 40 oriented so a center line 38 of the rear transverse carrier unit 40 extends parallel to a front side and rear side of the installed battery housing 90. The rear transverse carrier unit 40 contacts and is rigidly connected to the battery housing 90. The rigid connection between the rear transverse carrier unit 40 and the battery housing 90 may be created for example by welding or brazing along the entire transverse extension of the battery housing 90.

The rear transverse carrier unit 40, the left rear longitudinal control arm 36a, and right rear longitudinal control arm 36b form a U-shaped unit which, in the region of the longitudinal control arms 36a, 36b, is adapted to the battery housing 90 with the necessary spacing to achieve a compact structure of the chassis device 10, wherein the propulsion battery can be received in the battery housing 90 of the chassis device 10 without restrictions in relation to form.

In this embodiment, the front wheel suspension device 12 and the rear wheel suspension device 34 are similarly constructed. The rear wheel suspension device 34 may be transferred to the front wheel suspension device 12 by a 180° rotation about a vertical axis of the motor vehicle, parallel to the selected Z direction. While further descriptions of the embodiments of the chassis device 10 relates solely to the corresponding front wheel suspension, the same suspension can be a rear wheel suspension.

Figure 2:
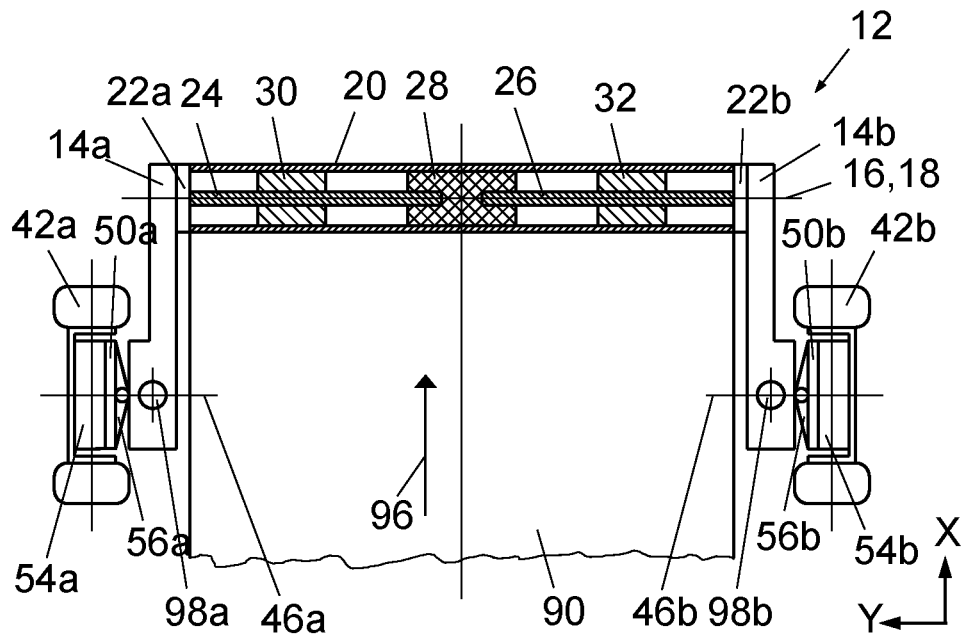
FIG. 2 is a diagrammatic cut-away top view of the area shown in square 1A of FIG. 1, showing the front wheel suspension.

FIG. 2 shows, in a cut-away top view, a diagrammatic depiction of extract 1A from FIG. 1 with details of a semi-active front wheel suspension device 12, wherein the section plane (XY plane) is defined by center points of the four wheel-tire combinations 42a, 42b, 44a, 44b shown in FIG. 1.

The front wheel-tire combinations 42a, 42b are each rigidly connected to a wheel hub motor 54a, 54b that is attached to a wheel carrier 50a, 50b fitted to the wheel-facing end of each of the left and right front longitudinal control arms 14a, 14b. At the wheel-facing end, each of the front longitudinal control arms 14a, 14b has a damper 98a, 98b. The connection of each of the front wheel carriers 50a, 50b to the corresponding longitudinal control arm 14a, 14b is created by an electric steering system 56a, 56b, configured for example as a steer-by-wire system.

FIG. 2 shows by two bearing units 22a, 22b coupling the front transverse carrier unit 20 to the left front longitudinal control arm 14a and the right front longitudinal control arm 14b. The two bearing units 22a, 22b, are each arranged between the front transverse carrier unit 20 and one of the front longitudinal control arms 14a, 14b. In this way, the front longitudinal control arms 14a, 14b move about a pivot axis 16 oriented transversely to the direction of travel 96 of the motor vehicle and coinciding with the center line 16 of the front transverse carrier unit 20.

The front wheel suspension device 12 has a left torsion spring 24 and a right torsion spring 26, both are formed as straight elongated torsion springs, for example torsion bar springs, and arranged inside the front transverse carrier unit 20 along the center line 16. The torsion springs 24, 26 may have a rectangular or round cross-section and be made in one embodiment from steel. An outer end of the left torsion spring 24 is actively connected to the end of the left front longitudinal control arm 14a facing away from the wheel to transmit a torsion moment, wherein an outer end of the right torsion spring 26 is actively connected to the end of the right front longitudinal control arm 14b facing away from the wheel to transmit a torsion moment.

The front transverse carrier unit 20 couples the left torsion spring 24 and right torsion spring 26. The coupling formed as a rigid connection and using a clamp element 28 arranged centrally inside the front transverse carrier unit 20 and fixedly connected to an inside of the hollow profile. The coupling, instead of the clamp element 28 may also be formed as a releasable fixed connection. The inside ends of the left torsion spring 24 and right torsion spring 26 are inserted in insertion openings arranged in the left and right sides of the clamp element 28 and adapted to the dimensions of the torsion springs 24, 26, and are attached therein. If the torsion springs 24, 26 have a rectangular cross-section, a torsion moment may be transmitted particularly securely and effectively from the front longitudinal control arms 14a, 14b to the front transverse carrier unit 20. Due to the rigid connection between each of the two torsion springs 24, 26 and the front transverse carrier unit 20 application of a torsion moment to the front transverse carrier unit 20 and hence to the battery housing 90 from compression of the left longitudinal control arm 14a, and application of a torsion moment to the front transverse unit 20 and hence to the battery housing 90 from compression of the right longitudinal control arm 14b, are independent of each other.

An embodiment of the chassis 10 includes two electrically controllable actuators 30, 32 arranged inside the hollow profile of the front transverse carrier unit 20. Each of the two actuators 30, 32 that creates a mechanical coupling between the front transverse carrier unit 20 and one of the two torsion springs 24, 26, by activating the actuator 30, 32, a desired degree of springing of the mechanical coupling can be set, providing a chassis 10 with a semi-active front wheel suspension device 12 and a semi-active rear wheel suspension device 34.

Figure 3:
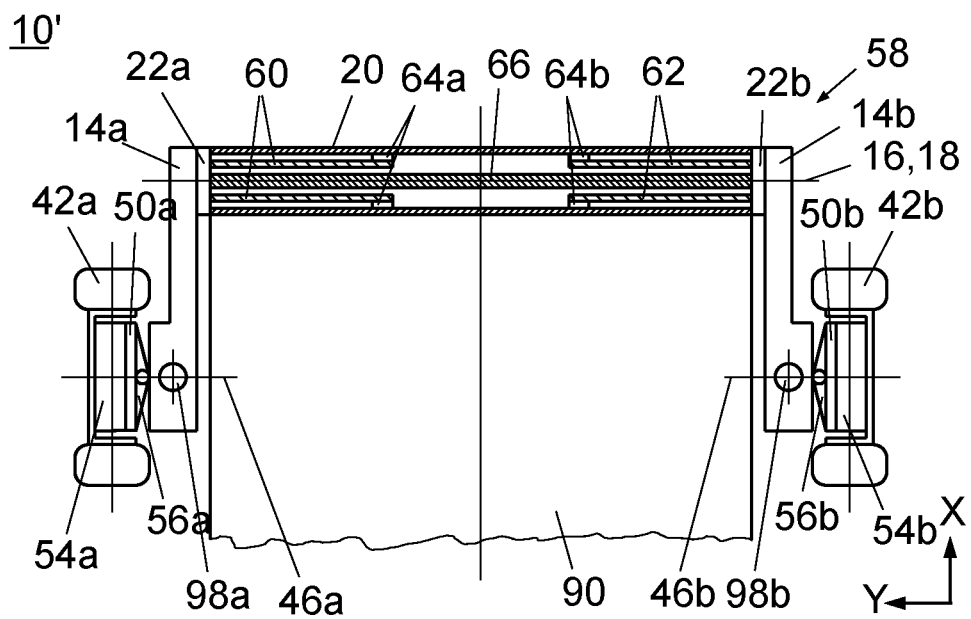
FIG. 3 is a diagrammatic cut-away top view, similar to the view of FIG. 2, of a chassis according to an alternative embodiment.

FIG. 3 shows a diagrammatic view of an alternative embodiment of the chassis 10' with an alternative, passive front wheel suspension device 58, in the same view as FIG.

2. To avoid repetition, only the differences from the preceding embodiment of the chassis device 10 are described below.

In the passive front wheel suspension device 58 of the chassis 10' of FIG. 3, two torsion springs 60, 62 are arranged in the front transverse carrier unit 20. The torsion springs 60, 62 are formed as hollow torsion bar springs, for example a torsion tube, and arranged coaxially to the center line 16 of the front transverse carrier unit 20. The two torsion springs may also be formed by wound torsion springs in the form of cylindrical coil springs. The coupling of the two torsion spring 60, 62 to the front transverse carrier unit 20 takes place via a respective ring element 64a, 64b which is arranged between an end of the torsion spring 60, 62 facing away from the respective longitudinal control arm 14a, 14b and the inner wall of the front transverse carrier unit 20, and connects the torsion spring 60, 62 fixedly to the front transverse carrier unit 20.

A stabilizer 66 helps stabilize the motor vehicle against roll. The stabilizer is a straight elongated torsion bar spring arranged in the interior of the front transverse carrier unit 20 along the common pivot axis 16 of the left front longitudinal control arm 14a and the right front longitudinal control arm 14b. The left end of the stabilizer 66, together with an outside end of the left torsion spring 60, is actively connected to the end of the left front longitudinal control arm 14a facing away from the wheel to transmit a torsion moment. The right end of the stabilizer 66, together with an outside end of the right torsion spring 62, is actively connected to the end of the right front longitudinal control arm 14b facing away from the wheel to transmit a torsion moment. The stabilizer 66 may be made for example from steel.

Figure 4:
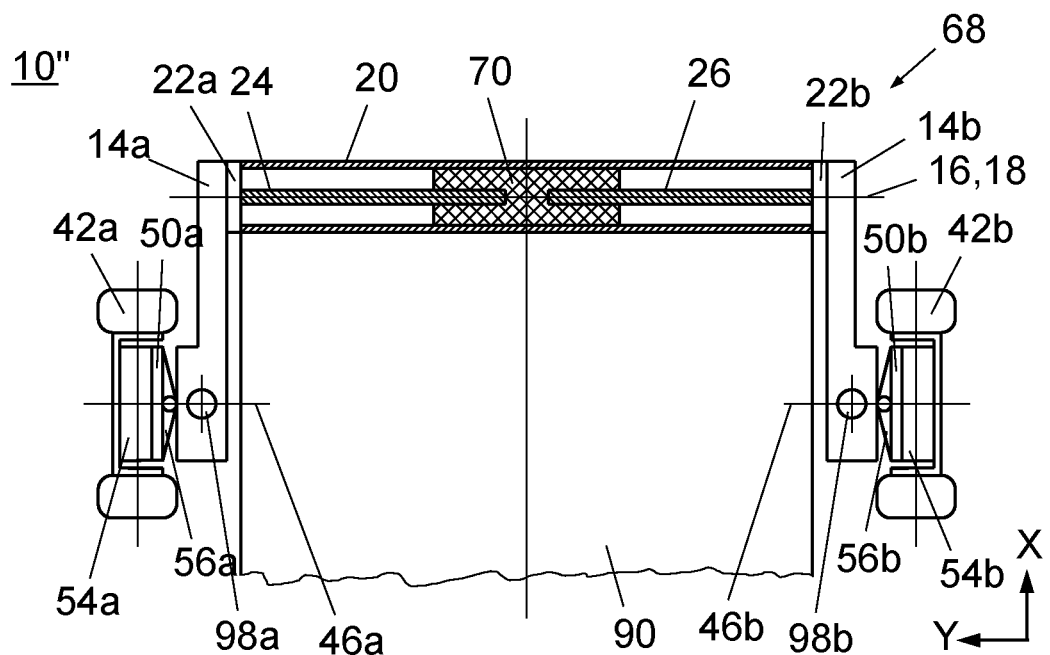
FIG. 4 is a diagrammatic cutaway top view, similar to the view of FIG. 2, of a chassis according to a further embodiment.

FIG. 4 shows a diagrammatic view of another embodiment of the chassis 10 with an alternative, semi-active front wheel suspension device 68, shown in the same view as FIG. 2. To avoid repetition, again only the differences from the embodiment of the chassis 10 according to FIG. 2 are described below.

In the semi-active front wheel suspension device 68 of the chassis device 10" shown in FIG. 4 two torsion springs 24, 26 are arranged in the front transverse carrier unit 20, each formed as straight elongated torsion bar springs. An actuator unit 70 couples the two torsion springs 24, 26 to the front transverse carrier unit 20. The actuator unit 70 includes an actuator 72 arranged centrally in the front transverse carrier unit 20.

Figure 5:
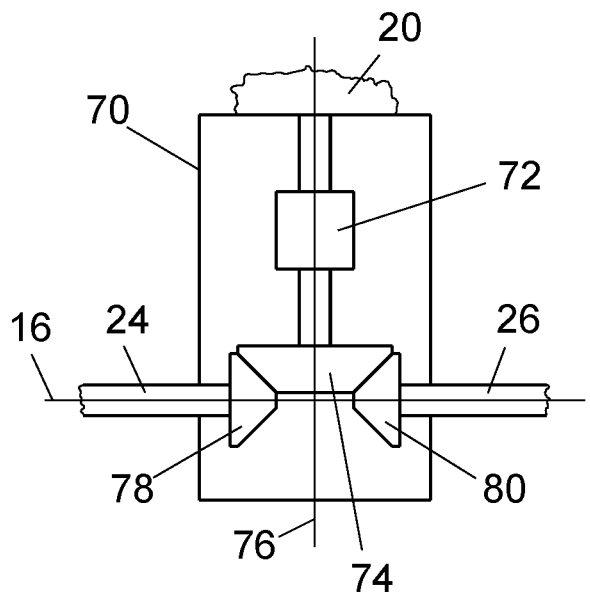
FIG. 5 is a diagrammatic depiction of a detail of the active front wheel suspension of FIG. 4.

FIG. 5 shows the structure and function of the actuator unit 70. The actuator unit 70 includes an electrically controllable actuator 72 fixedly connected on one side to the front transverse carrier unit 20. On a side facing away from the front transverse carrier unit 20, the actuator 72 includes a bevel gear wheel 74. When the actuator 72 is activated, an angular position of the bevel gear wheel 74 may be set about a rotation axis 76, oriented perpendicularly to the center line 16 of the front transverse carrier unit 20. The inside ends of the two torsion springs 24, 26 are provided with respective bevel gear wheels 78, 80 corresponding to the bevel gear wheel 74 of the actuator 72. The bevel gear wheel 74 of the actuator 72 meshes with the two bevel gear wheels 78, 80 of the two torsion springs 24, 26, so the three bevel gear wheels 74, 78, 80 form a differential gear mechanism.

On equal compression of the wheel-tire combinations 42a, 42b on both sides, for example in straight-ahead travel on a flat road surface, no torque acts on the bevel gear wheels 74 of the actuator 72. The electrically controllable actuator 72 in this case may be in a self-locking state or be actively blocked.

On cornering, with differing compression of the wheel-tire combinations 42a, 42b, a partial or complete compensation for a roll movement of the motor vehicle may be achieved by the electric actuator 72.

The chassis may also have more than one battery housing. If so, each of the battery housings is provided to receive at least one propulsion battery of the motor vehicle.

Figure 6A:
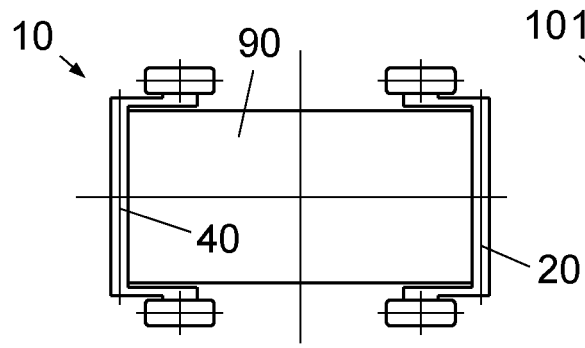
FIGS. 6a-6d are diagrammatic depictions of the chassis according to FIG. 1 and alternative embodiments of the chassis.
Figure 6B:
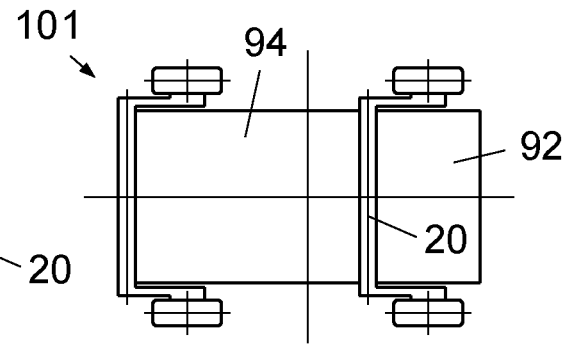
Figure 6C:
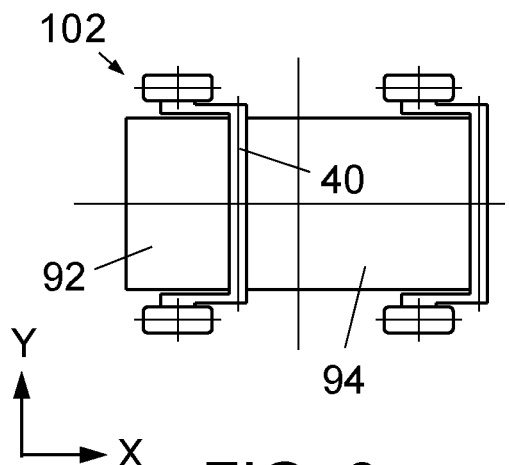
Figure 6D:
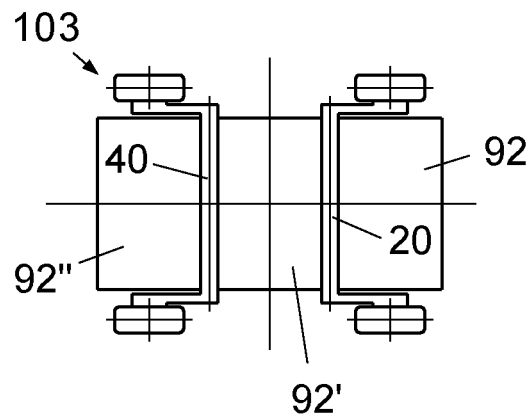

FIGS. 6a-6d show diagrammatic depictions of alternative embodiments of the chassis. FIG. 6a shows the embodiment of the chassis 10 of FIG. 1, with FIGS. 6b-6d showing alternative embodiments of the chassis with more than one battery housing, in the same view as FIG. 6a. The possible embodiments of the chassis shown in FIGS. 6a-6d illustrate the flexible design possibilities.

FIG. 6b shows a chassis 101 having two cuboid battery housings 92, 94 of different sizes, each receiving a propulsion battery. In contrast to the chassis device 10 of FIG. 6a, the front transverse carrier unit 20 is between the two battery housings 92, 94 and is in mutual contact with the rear side of the front battery housing 92 and the front side of the rear battery housing 94. The front transverse carrier unit 20 may be rigidly connected to either the front battery housing 92, the rear battery housing 94, or both battery housings 92, 94.

FIG. 6c shows a chassis 102 having two cuboid battery housings 92, 94 of different sizes, each receiving a propulsion battery. In contrast to the chassis device 10 of FIG. 6a the rear transverse carrier unit 40 is arranged between the two battery housings 92, 94 and is in mutual contact with the rear side of the front battery housing 92 and the front side of the rear battery housing 94. The rear transverse carrier unit 40 may be rigidly connected to either the front battery housing 92, the rear battery housing 94, or both battery housings 92, 94.

FIG. 6d shows a chassis 103 having three cuboid battery housings 92, 92', 92" of the same size, each receiving a propulsion battery. In contrast to the chassis 10 of FIG. 6a the rear transverse carrier unit 40 is arranged between the middle battery housing 92' and the rear battery housing 92" and is in mutual contact with the rear side of the middle battery housing 92' and the front side of the rear battery housing 92". The rear transverse carrier unit 40 may be rigidly connected to either the middle battery housing 92', the rear battery housing 92", or both battery housings 92', 92". The front transverse carrier unit 20 is arranged between the front battery housing 92 and the middle battery housing 92' and is in mutual contact with the front side of the middle battery housing 92' and the rear side of the front battery housing 92. The front transverse carrier unit 20 may be rigidly connected to either the front battery housing 92, the middle battery housing 92', or both battery housings 92, 92'.

Figure 7:
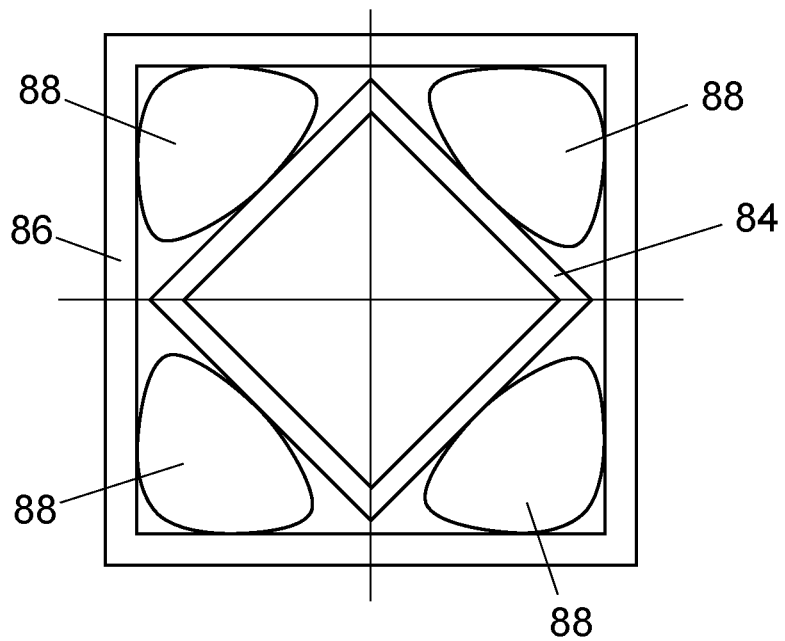
FIG. 7 is a diagrammatic depiction of an alternative embodiment of a torsion spring in unloaded state, in a section plane arranged perpendicularly to the transverse direction.
Figure 8:
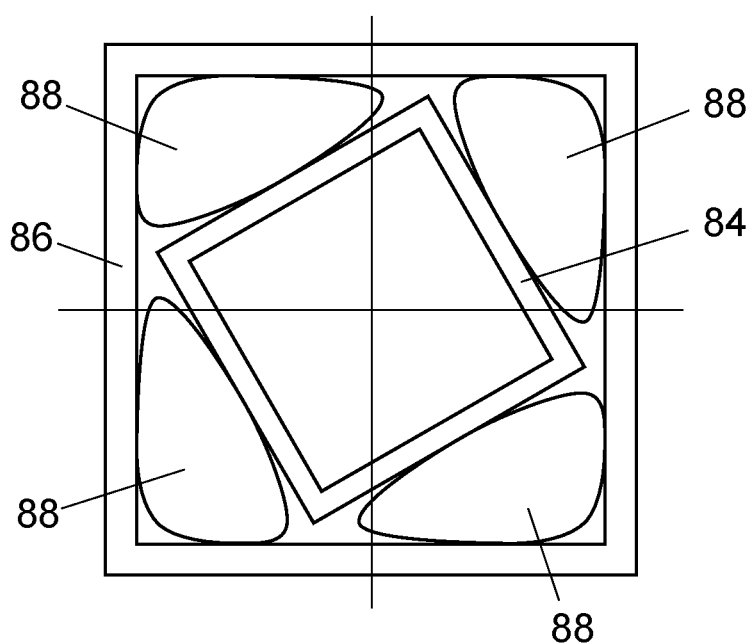
FIG. 8 is a diagrammatic depiction of the torsion spring of FIG. 7 in loaded state.

The torsion springs 24, 26, 60, 62, of the embodiments of the chassis, may be replaced by embodiments of a rubber-elastic torsion spring 82 depicted diagrammatically in FIGS. 7 and 8. FIGS. 7 and 8 show the rubber-elastic torsion spring 82 in a section plane arranged perpendicularly to the transverse direction, in an unloaded state, FIG. 7, and a loaded state, FIG. 8.

The rubber-elastic torsion spring 82 contains a central, square, four-sided profiled rod 84, which in an unloaded state is inserted in a surrounding outer, square, four-sided profiled rod 86 to be twisted relative thereto through an angle of around 45°. In the resulting inner corner spaces of the outer four-sided profiled rod 86, the rubber-elastic torsion spring 82 has four identical, rubber-elastic molded pads

88 formed of an elastomer, for example from synthetic rubber such as butadiene rubber. Since elastomers have rubber-elastic properties and therefore inherently have a non-linear spring curve, a desired non-linearly progressive spring curve of the torsion spring 82 can thus be obtained.

The central, square, four-sided profiled rod 84 is provided for creating the active connection with one of the longitudinal control arms 14*a*, 14*b*, 36*a*, 36*b*. The outer, square, four-sided profiled rod 86 is provided for fixed connection to the front transverse carrier unit 20 or rear transverse carrier unit 40.

The foregoing embodiments provide a chassis of an electrically powered motor vehicle allowing high driving comfort with a compact arrangement, and which considers a predefined installation space for receiving an electrical energy source of an electric drive of the motor vehicle, wherein the space is optimized for the electrical energy source. The electrical energy source may be at least one energy accumulator, for example a rechargeable accumulator, and/or by at least one energy converter, for example a fuel cell stack. The general terms "battery" or "propulsion battery" are used as synonyms for such electrical energy sources.

The chassis 10 for an electrically powered motor vehicle includes a front wheel suspension 12 and a rear wheel suspension 34 each having longitudinal control arms arranged on both sides and at least one torsion spring actively connected to at least one of the longitudinal control arms. The chassis further includes a battery housing for receiving a propulsion battery. The battery housing between the respective longitudinal control arms of the front wheel suspension and the rear wheel suspension. A transverse carrier unit, rigidly connected the battery housing, joins the two longitudinal control arms of the suspension and the respective torsion spring.

The term "motor vehicle" means a car, a transporter, a truck, a semitrailer tractor unit or a motor bus.

The term "actively connected" means objects are connected mechanically so it is possible to transmit a force and/or a torque and/or a torsion moment between the objects. Transmission may take place both by direct contact and indirectly via an intermediate element.

The exemplary embodiment includes a vehicle chassis having a compact wheel suspension and the propulsion battery of an electrically powered motor vehicle, wherein a high driving comfort may be achieved and restrictions, due to components of the suspension, in relation to the form and size of installation space for receiving the electrical energy source, may be avoided. In this way, the installation space may be adapted to the propulsion battery which may be designed optimally regarding the requirements arising from the electrical propulsion of the motor vehicle.

The rigid connections between the battery housing and the transverse carrier units may be configured as releasable rigid connections, i.e. connections which can be reversibly created and released, manually and/or automatically. The rigid connections may also be a form-fit connection, for example by welding.

In one embodiment the transverse carrier unit of the front wheel suspension is rigidly connected to a front side of an installed battery housings, and the transverse carrier unit of the rear wheel suspension is rigidly connected to a rear side of an installed battery housings, achieving a compact embodiment of the chassis.

The battery housing is substantially cuboid. The term "substantially cuboid" means a deviation of an amount of a volume of the space enclosed by the battery housing from an amount of a minimal cube enclosing the battery housing is less than 30%, preferably less than 20% and particularly preferably less than 15%.

The wheel-facing ends of the longitudinal control arms of the front wheel suspension and the rear wheel suspension may be equipped in the known fashion with wheel carriers and receivers for dampers.

In additional embodiments of the chassis, the transverse carrier unit of at least one of the front wheel suspension and the rear wheel suspension is coupled to the ends facing away from the wheel of the respective longitudinal control arms. This ensures the longitudinal control arms of the suspension device cover the battery housing in a direction transversely to the forward travel direction of the motor vehicle, achieving a compact arrangement of the suspension.

In various embodiments, the torsion springs may be formed as straight, elongated torsion springs—torsion bar springs, as wound torsion springs—coil springs, as hollow torsion bar springs—torsion tubes, as rubber-elastic torsion springs or as a combination of the torsion springs. Thus, the design possibilities for producing the torsion springs of the suspension are flexible.

Preferably, the transverse carrier unit of the front wheel suspension and the rear wheel suspension is formed as a hollow profiled rail and configured with a center line of the hollow profiled rail parallel to a front side or rear side of the installed battery housing. In this way, a transverse carrier unit may be provided that is easy to produce and in which a rigid connection to the battery housing can be created easily and effectively.

The term "provided for" means designed or arranged for.

In the embodiment of the chassis, coupling of the torsion spring to the transverse carrier unit is configured as a rigid connection. Thus, in a simple structural fashion, a chassis may be provided having a passively acting suspension.

Preferably, at least one of the front wheel suspension and rear wheel suspension has two torsion springs, each actively connected to one of the longitudinal control arms.

Independently coupling the two torsion springs to the transverse control unit, which is rigidly connected to the battery housing, achieves independently stabilized wheel suspensions on a front wheel suspension and/or rear wheel suspension.

If the two torsion springs are configured as cylindrical coil springs or as torsion tubes, a free region may be provided close to a center line of the cylindrical coil spring or torsion tube, which may receive further components of the front wheel suspension and/or rear wheel suspension. For example, to receive a stabilizer bar coupled to the longitudinal control arms of the suspension.

One embodiment includes one of the front wheel suspension device and rear wheel suspension device having two torsion springs, in the transverse control units, wherein coupling of the transverse control unit to the respective torsion spring is by an electrically controllable actuator. The electrically controllable actuator influencing a rotary movement of the torsion spring, providing the chassis with at least one actively acting suspension device, which individually influences each of the two torsion springs.

A single electrically controllable actuator may couple the transverse control unit of the respective suspension to both torsion springs. Using a single electrically controllable actuator provides a chassis having an actively acting suspension device in a structurally particularly simple and component-saving manner.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A chassis for an electrically powered vehicle comprising:
   a front wheel suspension including first and second front longitudinal control arms and a front torsion spring actively connected to at least one of the first and second front longitudinal control arms;
   a rear wheel suspension including first and second rear longitudinal control arms and a rear torsion spring actively connected to at least one of the first and second rear longitudinal control arms;
   a battery housing;
   a front transverse carrier rigidly connected to said battery housing and rotatably supporting the first and second front longitudinal control arms of the front wheel suspension; and
   a rear transverse carrier rigidly connected to said battery housing and rotatably supporting the first and second rear longitudinal control arms of the rear wheel suspension.

2. The chassis of claim 1 wherein said front and rear torsion springs include at least one of a straight elongated torsion spring, a wound torsion spring, a hollow torsion bar spring, and a rubber-elastic torsion spring.

3. The chassis of claim 1 wherein the front torsion spring includes first and second front torsion springs, said first front torsion spring actively connected to said first front longitudinal control arm and said second front torsion spring actively connected to said second front longitudinal control arm; and
   the rear torsion spring includes first and second rear torsion springs, said first rear torsion spring actively connected to said first rear longitudinal control arm and said second rear torsion spring actively connected to said second rear longitudinal control arm.

4. The chassis of claim 3 wherein said first and second front torsion springs and said first and second rear torsion springs include at least one of a cylindrical coil spring and a torsion tube.

5. The chassis of claim 3 including a front electrically controllable actuator coupling the front transverse carrier to the first and second front torsion springs; and
   a rear electrically controllable actuator coupling the rear transverse carrier to the first and second rear torsion springs.

6. A chassis for an electrically powered vehicle comprising:
   a wheel suspension including first and second longitudinal control arms;
   a battery housing;
   a transverse carrier having a hollow profile defining a cavity, said transverse carrier rigidly connected to said battery housing and rotatably supporting the first and second longitudinal control arms of the wheel suspension;
   a torsion spring disposed within said cavity and connected to at least one of the first and second longitudinal control arms and to said transverse carrier; and
   an electrically controllable actuator disposed within said cavity, said actuator coupling the transverse carrier to the torsion spring.

7. The chassis of claim 6 wherein the torsion spring includes first and second torsion springs, said first torsion spring connected to said first longitudinal control arm and said second torsion spring connected to said second longitudinal control arm.

* * * * *